US010541748B1

(12) United States Patent
Chedore

(10) Patent No.: US 10,541,748 B1
(45) Date of Patent: Jan. 21, 2020

(54) MULTI-FIBER INTERFACE AUTOMATIC POWER REDUCTION SYSTEMS AND METHODS

(71) Applicant: Ciena Corporation, Hanover, MD (US)

(72) Inventor: Paul Chedore, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/364,749

(22) Filed: Mar. 26, 2019

(51) Int. Cl.
*H04B 10/079* (2013.01)
*G02B 6/42* (2006.01)
*H04B 10/2581* (2013.01)

(52) U.S. Cl.
CPC ..... *H04B 10/07955* (2013.01); *G02B 6/4215* (2013.01); *G02B 6/4286* (2013.01); *H04B 10/2581* (2013.01); *H04B 2210/08* (2013.01)

(58) Field of Classification Search
CPC .............. H04B 10/07955; H04B 10/25; H04B 10/2581; H04B 2210/08; G02B 6/4286; G02B 6/4215
See application file for complete search history.

(56) References Cited

U.S. PATENT DOCUMENTS

| 9,768,902 | B2 | 9/2017 | Al Sayeed et al. | |
|---|---|---|---|---|
| 2014/0241720 | A1* | 8/2014 | Ji | H04Q 11/0066 398/50 |
| 2016/0099851 | A1* | 4/2016 | Archambault | H04J 14/0212 398/16 |
| 2016/0315709 | A1* | 10/2016 | Kachita | H04B 10/564 |
| 2017/0346591 | A1 | 11/2017 | Chedore et al. | |
| 2018/0234749 | A1 | 8/2018 | Chedore et al. | |

* cited by examiner

*Primary Examiner* — Casey L Kretzer
(74) *Attorney, Agent, or Firm* — Clements Bernard Walker; Christopher L. Bernard; Lawrence A. Baratta, Jr.

(57) ABSTRACT

An automatic power reduction (APR) system for an optical network module, including: a multi-fiber interface including a plurality of ports adapted to be coupled to one or more multi-fiber connectors; a card processor operable to detect a loss of signal on an input port of the plurality of ports and comparing the power of an associated output port to an activation threshold received by the card processor; and a module processor operable to, in the event that the loss of signal is detected on the input port and the power of the output port exceeds the activation threshold, trigger the optical network module to execute an APR routine and attenuate spectrum associated with an affected port using a wavelength selective switch coupled to the plurality of ports.

18 Claims, 5 Drawing Sheets

MULTI-FIBER INTERFACE AUTOMATIC POWER REDUCTION SYSTEMS AND METHODS

TECHNICAL FIELD

The present disclosure relates generally to the optical networking field. More specifically, the present disclosure relates to multi-fiber interface Automatic Power Reduction (APR) systems and methods based on a spectrum-specific Wavelength Selective Switch (WSS) response.

BACKGROUND ART

Automatic Power Reduction (APR) is a phrase that is used in the context of laser safety. System fibers frequently have more power than is acceptable for an open interface. Thus, the system must detect an open connection and then lower the power within a certain amount of time to limit exposure and potential eye damage. This is mandated by IEC60825, for example.

Colorless-Directionless (CD), Colorless-Directionless-Add (CDA), and Colorless-Directionless-Contentionless (CDC) Reconfigurable Optical Add-Drop Multiplexer (ROADM) architectures continue to grow in popularity. These ROADM types typically utilize Multi-Fiber Push-On (MPO) style cables or the like to keep the intra-node fibering manageable. Roughly speaking, these multi-fiber cables are treated as a single point source from a laser safety perspective. As such, the sum of the emitted power from all sub-fibers cannot exceed the IEC 60825 Class 1M ("1M") limit of ~21.3 dBm based on certain conditions, for example. Therefore, if there are four active sub-fibers per cable, this translates into a per sub-fiber maximum of ~15.3 dBm.

In previous incarnations of ROADM design, it was possible to conform to this limit without requiring any sort of reactive mechanism. The number of channels, their spectral occupancies, and the system Power Spectral Density (PSD) targets resulted in a total power lower than the per sub-fiber maximum required to be 1M. In general, the PSD targets of channels remains constant regardless of their spectral occupancies. As such, the power requirement for a Colorless Channel Mux/Demux (CCMD) scales not only with the with the number of channels, but also with their spectral occupancies.

The drive for increased capacity, in combination with evolving technology, is resulting in changes that effectively increase the total spectrum, and, correspondingly, power, that a Wavelength Selective Switch (WSS) must direct towards a given CCMD (i.e., per sub-fiber). Increases in baud rate (e.g., 56, 75, 90+GBaud) lead to higher spectral occupancies of those channels. Further, the number of add/drop channels per CCMD is increasing (e.g., 12 to 24+). Still further, channel pre-combining acts as a port multiplier for the number of channels per CCMD (e.g., 4×24).

Together, these changes lead to the potential for a given CCMD to include 96 channels at more than 90 GHz of spectrum each. In effect, this is enough to fill a C or L-band of multiple degrees. As such, it is no longer possible to remain below the 1M limit for cables without an active response. The special challenge is to avoid collateral damage to the signal on other ports. Thus, what is needed is a spectrally selective response to one or more corresponding APR triggers.

In the past, clamp mechanisms or back reflection-based APR were frequently relied upon to maintain laser safety requirements. Clamping amplifiers to a power below the eye-safe limit is no longer possible as a result of the amount of spectrum, and thus power, being routed to a given CCMD port. Back reflection based APR is no longer possible due to the Angled Physical Contact (APC) termination of single-mode MPO cables.

SUMMARY

In various exemplary embodiments, the present disclosure provides a spectrum/port specific APR system and method that relies on rapid changes to WSS Liquid Crystal on Silicon (LCoS) or like grating patterns based on corresponding input Loss of Signal (LOS). Thus, spectrum-specific WSS response is leveraged. It should be noted that LCoS is an exemplary technology here only.

In one exemplary embodiment, the present disclosure provides an automatic power reduction (APR) system for an optical network module, including: a multi-fiber interface including a plurality of ports adapted to be coupled to one or more multi-fiber connectors; a card processor operable for detecting a loss of signal on an input port of the plurality of ports and comparing the power of an associated output port to an activation threshold received by the card processor; and a module processor operable for, in the event that the loss of signal is detected on the input port and the power of the output port exceeds the activation threshold, triggering the optical network module to execute an APR routine and attenuate spectrum associated with an affected port using a wavelength selective switch coupled to the plurality of ports. Optionally, the card processor and the module processor are respective functional portions of the same processor. The module processor is further operable for, in the event that the loss of signal is detected on the input port but the power of the output port does not exceed the activation threshold, declining to trigger the optical network module to execute the APR routine and attenuate the spectrum associated with the affected port using the wavelength selective switch coupled to the plurality of ports. Triggering the optical network module to execute the APR routine includes using a hardware line to cause the optical network module to execute the APR routine with priority over other routines. Attenuating the spectrum associated with the affected port using the wavelength selective switch coupled to the plurality of ports includes attenuating the spectrum associated with the affected port by a predetermined amount received by the module processor. Alternatively, attenuating the spectrum associated with the affected port using the wavelength selective switch coupled to the plurality of ports includes attenuating the spectrum associated with the affected port by a variable amount dependent upon a difference between the power of the output port and the activation threshold received by the module processor.

In another exemplary embodiment, the present disclosure provides an automatic power reduction (APR) method for an optical network module, including: given a multi-fiber interface including a plurality of ports adapted to be coupled to one or more multi-fiber connectors, at a card processor, detecting a loss of signal on an input port of the plurality of ports and comparing the power of an associated output port to an activation threshold received by the card processor; and, in the event that the loss of signal is detected on the input port and the power of the output port exceeds the activation threshold, at a module processor, triggering the optical network module to execute an APR routine and attenuate spectrum associated with an affected port using a wavelength selective switch coupled to the plurality of ports. Optionally, the card processor and the module processor are respective functional portions of the same processor. The method further includes, in the event that the loss of signal is detected on the input port but the power of the output port does not exceed the activation threshold, at the module processor, declining to trigger the optical network module to execute the APR routine and attenuate the spectrum associated with the affected port using the wavelength selective switch coupled to the plurality of ports. Triggering the optical network module to execute the APR routine includes using a hardware line to cause the optical network module to execute the APR routine with priority over other routines. Attenuating the spectrum associated with the affected port using the wavelength selective switch coupled to the plurality of ports includes attenuating the spectrum associated with the affected port by a predetermined amount received by the module processor. Alternatively, attenuating the spectrum associated with the affected port using the wavelength selective switch coupled to the plurality of ports includes attenuating the spectrum associated with the affected port by a variable amount dependent upon a difference between the power of the output port and the activation threshold received by the module processor.

In a further exemplary embodiment, the present disclosure provides a computer-readable medium storing computer-executable instructions configured to cause the following steps to occur: given a multi-fiber interface including a plurality of ports adapted to be coupled to one or more multi-fiber connectors, at a card processor, detect a loss of signal on an input port of the plurality of ports and compare the power of an associated output port to an activation threshold received by the card processor; and, in the event that the loss of signal is detected on the input port and the power of the output port exceeds the activation threshold, at a module processor, trigger the optical network module to execute an automatic power reduction (APR) routine and attenuate spectrum associated with an affected port using a wavelength selective switch coupled to the plurality of ports. Optionally, the card processor and the module processor are respective functional portions of the same processor. The steps further include, in the event that the loss of signal is detected on the input port but the power of the output port does not exceed the activation threshold, at the module processor, declining to trigger the optical network module to execute the APR routine and attenuate the spectrum associated with the affected port using the wavelength selective switch coupled to the plurality of ports. Triggering the optical network module to execute the APR routine includes using a hardware line to cause the optical network module to execute the APR routine with priority over other routines. Attenuating the spectrum associated with the affected port using the wavelength selective switch coupled to the plurality of ports includes attenuating the spectrum associated with the affected port by a predetermined amount received by the module processor. Alternatively, attenuating the spectrum associated with the affected port using the wavelength selective switch coupled to the plurality of ports includes attenuating the spectrum associated with the affected port by a variable amount dependent upon a difference between the power of the affected port and the activation threshold received by the module processor.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EMBODIMENTS

Figure 1:
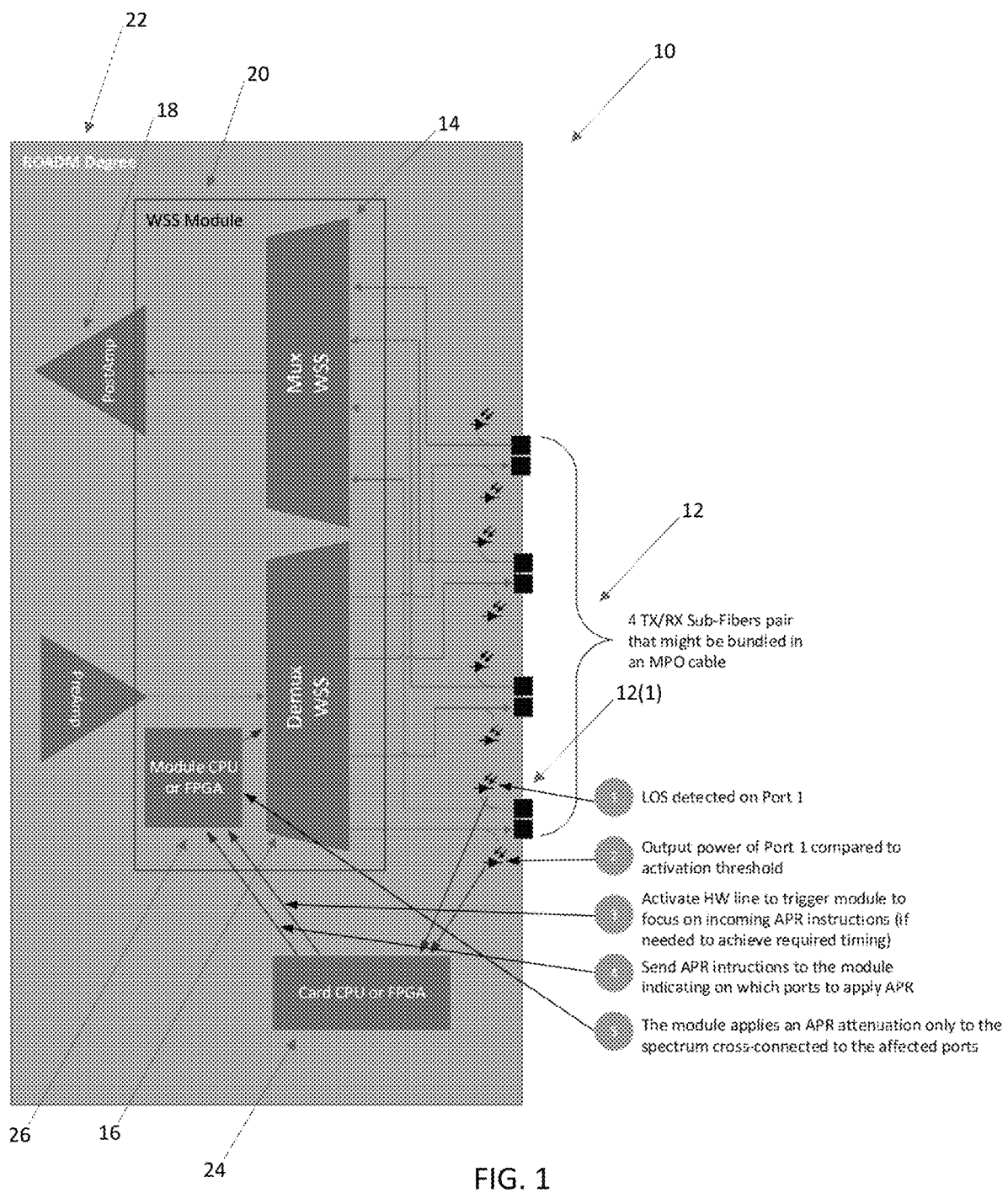
FIG. 1 is a schematic diagram illustrating one exemplary embodiment of the APR system of the present disclosure.

Again, in general, the present disclosure provides a spectrum/port specific APR system and method that relies on rapid changes to WSS LCoS grating patterns based on corresponding input LOS. Thus, spectrum-specific WSS response is leveraged.

The challenge with multi-fiber interfaces, such as MPO interfaces is that, due to the small separation between the sub-fibers, the aggregate of the sub-fibers is considered to be a single-point (or nearly single-point) source. As such, the 1M safety limit is applied to the sum of light emissions for all sub-fibers. In the C-band, that limit is ~21.3 dBm, which equates to no more than ~15.3 dBm per sub-fiber in a scenario where there are four fiber pairs per cable.

In previous generations of CDC ROADMs, for example, it was possible to clamp the per sub-fiber power below the maximum level while still achieving the appropriate PSD required for proper system performance. However, that was with a maximum of 16 channels at 56 GBaud. In more recent CDC ROADM designs, it is no longer possible to achieve the require PSD without exceeding this ~15.3 dBm per sub-fiber limit. This is due to the large increase in total signal spectrum associated with the jump to 24 add/drop channels per CCMD, the increase in supported baud rates (i.e., spectral occupancies), and channel pre-combining.

Table 1 below shows how it was possible to remain below the 1M limit as an aggregate in a previous generation of CDCs (CCMD8×16 @ 56 GHz), but this is no longer possible. The latest CCMD designs can now accommodate 96 channels at 90 GHz or greater. This is enough spectrum to fill two degrees.

TABLE 1

Comparison of the per sub-fiber power requirement based on CCMD ports and signal baud

| Configuration | Number of Channels | Spectral Occupancy (GHz) | PSD (dBm/ 12.5 GHz) | Total Sub-Fiber Power dBm) |
|---|---|---|---|---|
| CCMD8 × 16 (previous releases) | 16 | 56 | −5 | 13.6 |
| CCMD8 × 24 | 24 | 90 | −5 | 17.4 |
| CCMD8 × 24 (with pre-combiner) | 48 | 90 | −5 | 20.4 |

The present disclosure utilizes the nature of bi-directional fiber pairings within multi-fiber cables. The transmit (demux) and receive (mux) fiber pairs for a given port are collocated in the same MPO cable. As such, an input LOS can be used to detect an open connection. Unlike duplex LC connectors, it is impossible to subdivide MPO cable sub-fibers and, thus, an input LOS represents a reliable detection mechanism. Because the standard for single-mode MPO cables is APC termination, this makes reflection-based detection impossible.

When a LOS is detected on an input port, the response is to lower the power of only the spectrum cross-connected to that port via the WSS module's attenuation capability. Thus, traffic on other ports is unaffected. Additional logic compares the output power to an activation threshold before responding. If the power on that port is already below the multi-fiber maximum, the system may choose to skip the APR response.

To meet the Class 1M timing requirement, a Hardware (HW) line may be used to interrupt all other WSS module processes and prioritize the power reduction of one or more ports, as required. The following diagrams illustrate and describe how the mechanism can be implemented.

Referring now specifically to FIG. 1, in one exemplary embodiment, the APR system 10 of the present disclosure includes an MPO interface 12 with, in this case, 4 Tx/Rx sub-fibers. This MPO interface 12 is coupled to a Mux WSS 14 and a Demux WSS 16, both of which are coupled to an amplifier 18 (pre or post) within the module 20 and line amplifier 22, as is conventional. A card CPU or FPGA 24 is provided in the line amplifier 22 and a module CPU or FPGA is provided in the module 20, both of which are operable for enabling the functionality of the present disclosure. When the card CPU or FPGA 24 detects a LOS on Port 1 12(1), the output power of Port 1 12(1) is compared to an activation threshold. If this activation threshold is exceeded, a HW line is activated to trigger the module 20 to prioritize the forthcoming APR instructions. Specifically, the module 20 is notified via serial communications and the HW line may be used if needed based on timing requirements. These APR instructions are sent to the module 24 and indicate on which ports (e.g., Port 1 12(1)) to apply APR. The module 24 then applies APR attenuation only to the spectrum cross-connected to the affected ports (e.g., Port 1 12(1)). Other ports of the MPO interface 12 (or other MPO interfaces) are not affected. It should be noted that the power reduction slew rate can be controlled in order to mitigate transient effects. The LOS here may be a pulled connector or a fiber break, for example, as the intent is to ensure that free-space emitted light is at a safe power level.

Figure 2:
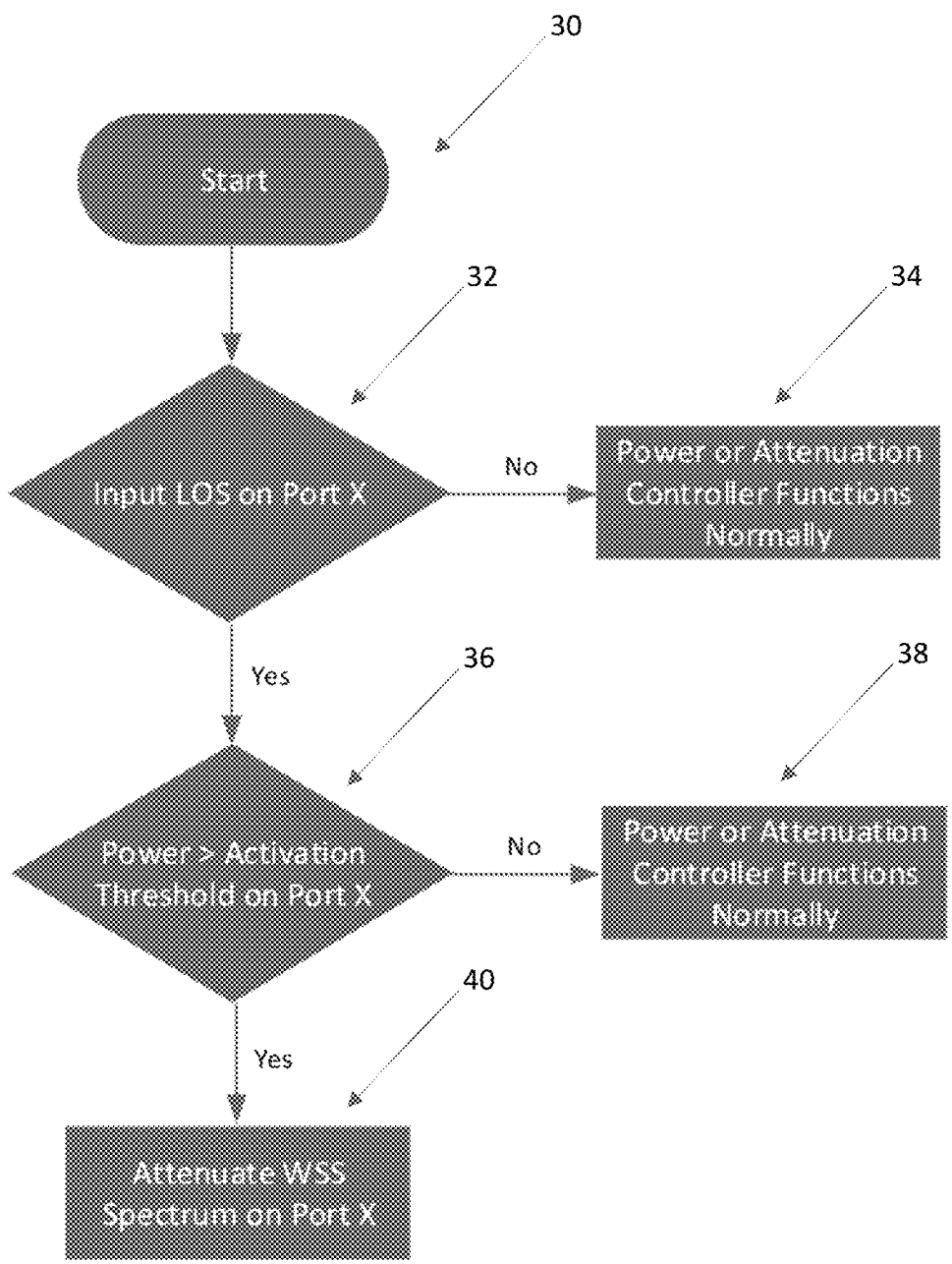
FIG. 2 is a flowchart illustrating one exemplary embodiment of the APR method of the present disclosure.

This methodology is illustrated in FIG. 2. The method 30 begins with a LOS detection on Port X 32. If no LOS is detected, then the power or attenuation controller functions normally and no APR action is taken 34. If a LOS is detected, then the power on Port X is compared to an activation threshold 36. If the power on Port X is already less than the activation threshold, then the power or attenuation controller functions normally and no APR action is taken 38. If the power on Port X exceeds the activation threshold, then the WSS spectrum on Port X is attenuated as part of the APR action 40.

Figure 3:
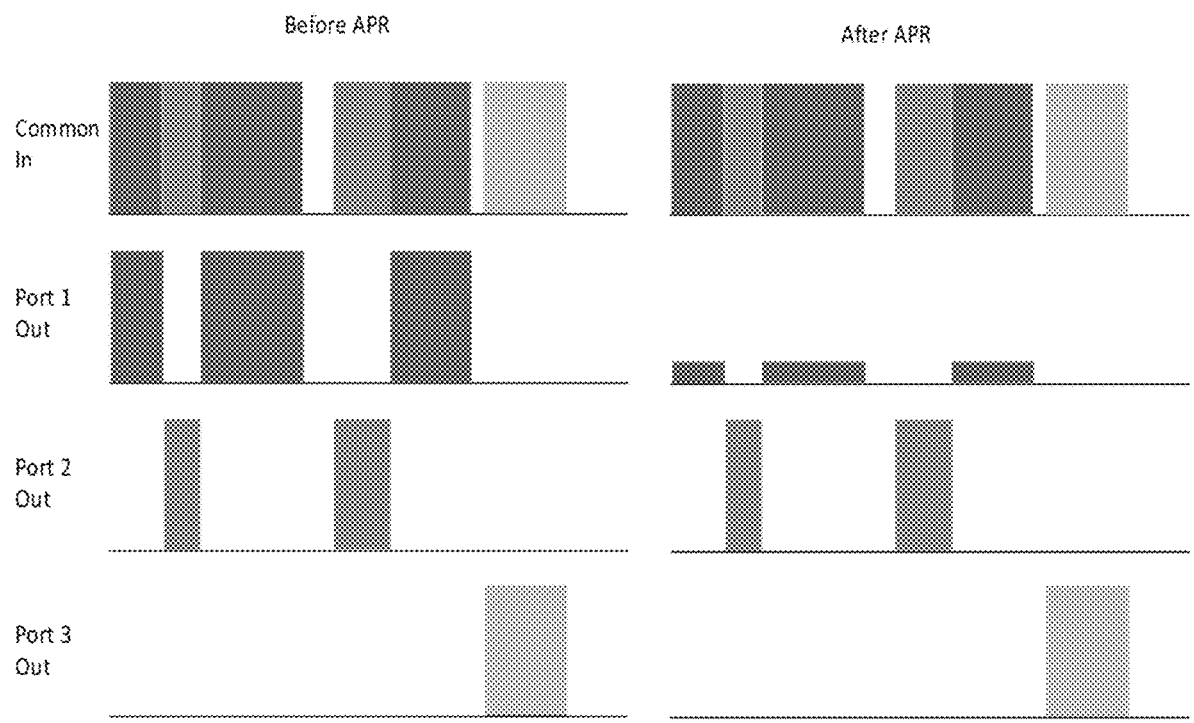
FIG. 3 is a schematic diagram illustrating the APR applied to only the spectrum of an affected port in accordance with the APR system and method of FIGS. 1 and 2.

FIG. 3 illustrates such an attenuation on Port 1 only. As can be seen, the common input receives a comparable WSS spectrum before and after APR, related to the outputs of Ports 1, 2, and 3, in the example provided. After APR, the WSS spectrum output associated with Port 1 is attenuated, while the WSS spectrum outputs associated with Ports 2 and 3 remain the same.

Figure 4:
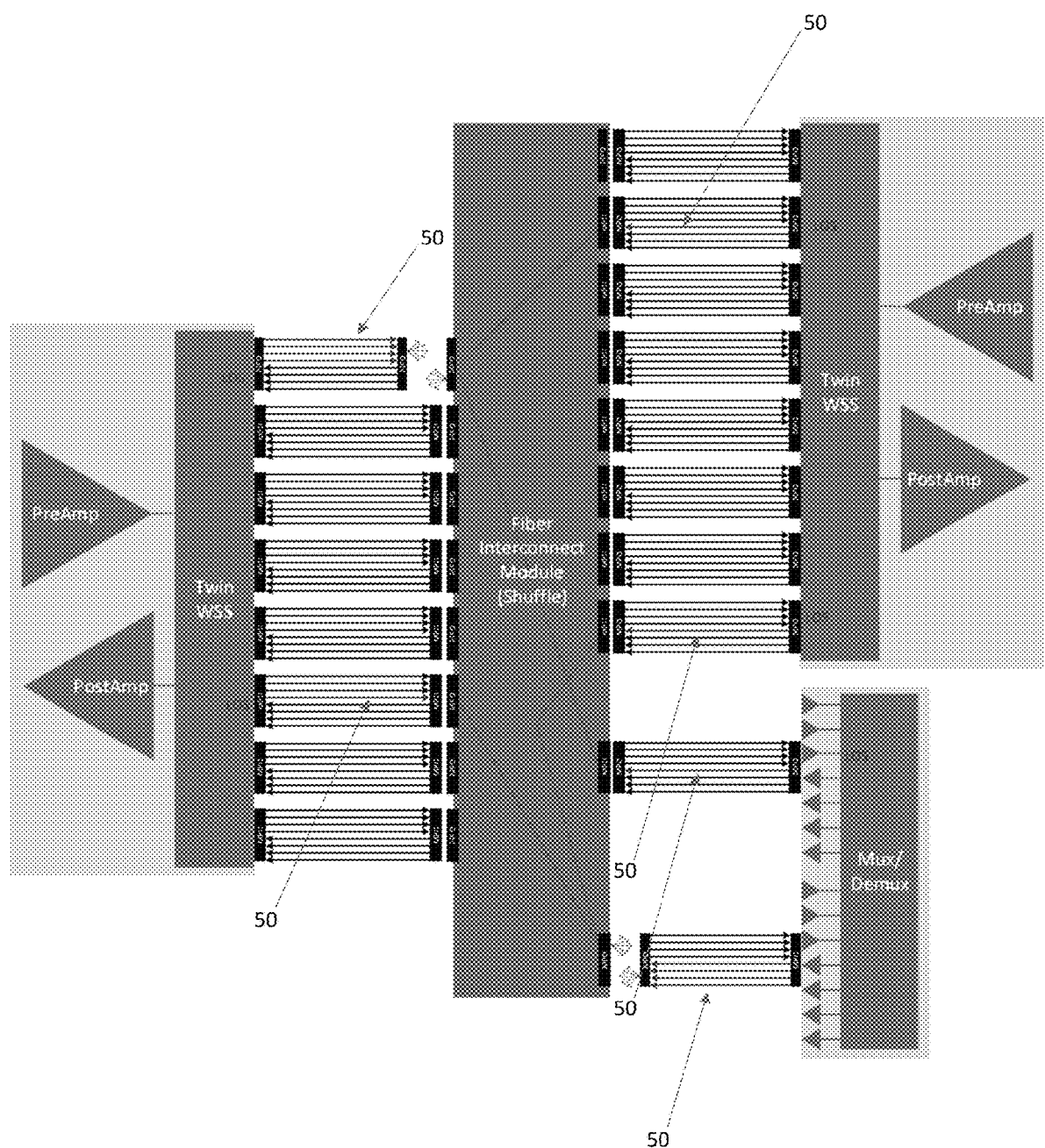
FIG. 4 is a schematic diagram illustrating the need for per sub-fiber APR response such that other ports are not affected.

FIG. 4 is a schematic diagram illustrating the need for per sub-fiber APR response such that other ports are not affected. With only the WSS spectrum associated with selected ports 50 targeted by the APR scheme, numerous other ports and channels are unaffected.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Thus, the present disclosure solves a laser safety challenge without resorting to additional HW or an approach that adds cost and reduces performance. Alternatives to using the WSS to reduce power would be: mute the amp, which would impact all traffic associated with that degree unnecessarily (causing collateral damage), or adding shutters to all WSS demux ports, which would add thousands to the cost and increase the ROADM loss and thus impact performance. Therefore, the present disclosure provides a superior solution. Advantageously, the systems and methods provided herein are flexible in terms of the number of active sub-fibers. A per sub-fiber response is provided that uses input LOS to trigger APR to a level that is calculated per sub-fiber maximum power limit, for example, <15 dBm based on a specific implementation of four sub-fibers per MPO and given assumptions regarding photodiode accuracy, etc.

Possible attenuation schemes include fixed attenuation, port-specific fixed attenuation, and just enough attenuation. In fixed attenuation, if an input LOS is detected, then the attenuation of the spectrum associated with the corresponding port defaults to a universal (provisionable) value, for example, ~5 dB, regardless of port power. This is simple and responsive, but could result in unnecessarily large power transients. In port-specific fixed attenuation, minimum nominal power values can be considered for each port. Again, this is simple and responsive, but could still result in unnecessarily large power transients. In just enough attenuation, one considers how much above the APR activation power the output is and a bulk offset is added to achieve an eye safe level. This minimizes power transients, but more calculation complexity is required. This could be mitigated by keeping attenuation profiles at the ready for every port, for example.

Figure 5:
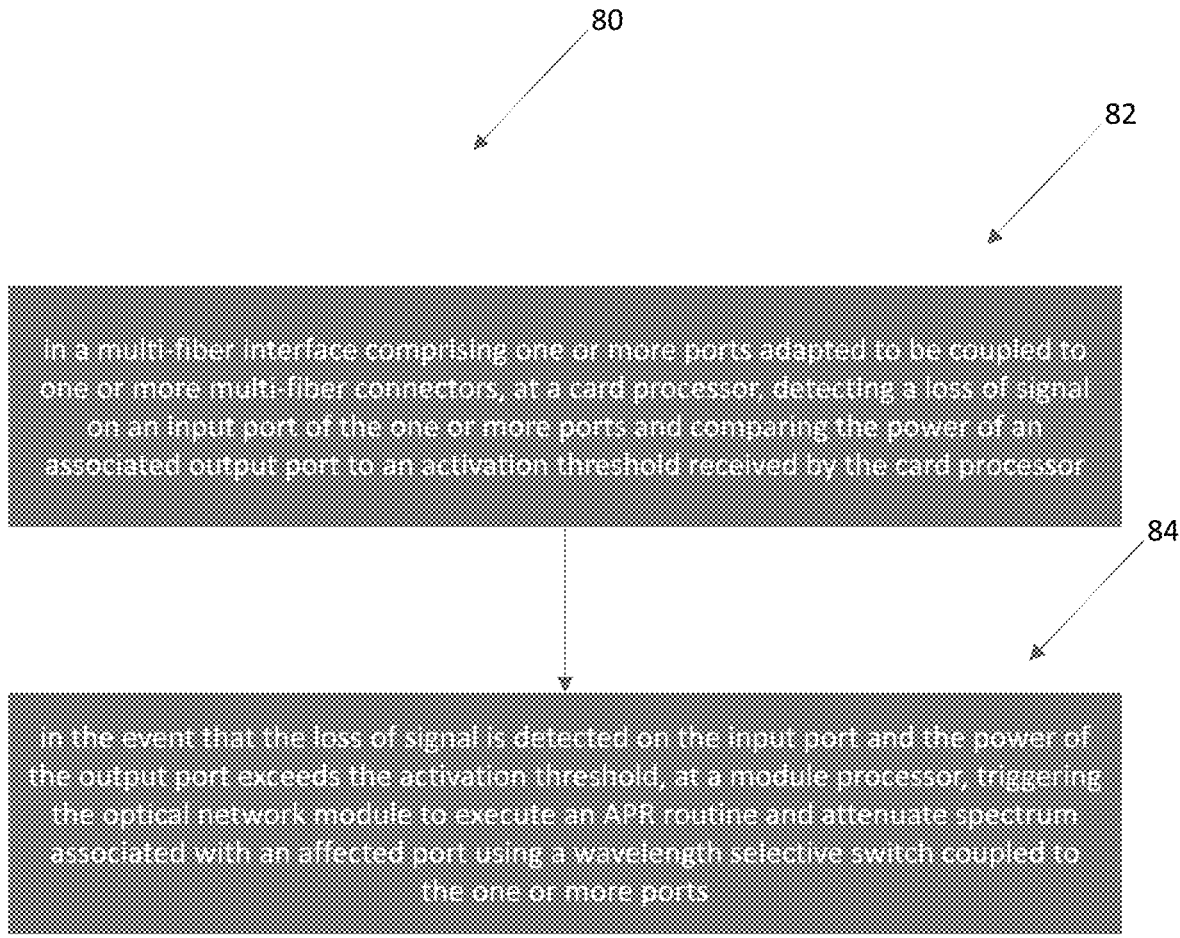
FIG. 5 is a flowchart of illustrating an automatic power reduction (APR) process for an optical network module.

FIG. 5 is a flowchart of an automatic power reduction (APR) process 80 for an optical network module. The process 80 includes, in a multi-fiber interface comprising one or more ports adapted to be coupled to one or more multi-fiber connectors, at a card processor, detecting a loss of signal on an input port of the one or more ports and comparing the power of an associated output port to an activation threshold received by the card processor (step 82); and, in the event that the loss of signal is detected on the input port and the power of the output port exceeds the activation threshold, at a module processor, triggering the optical network module to execute an APR routine and attenuate spectrum associated with an affected port using a wavelength selective switch coupled to the one or more ports (step 84). The card processor and the module processor can be respective functional portions of the same processor.

The process 80 can further include, in the event that the loss of signal is detected on the input port but the power of the output port does not exceed the activation threshold, at the module processor, declining to trigger the optical network module to execute the APR routine and attenuate the spectrum associated with the affected port using the wavelength selective switch coupled to the one or more ports. Triggering the optical network module to execute the APR routine can include using a communications line to cause the optical network module to execute the APR routine with priority over other routines. Attenuating the spectrum associated with the affected port using the wavelength selective switch coupled to the one or more ports can include attenuating the spectrum associated with the affected port by a predetermined amount received by the module processor. Attenuating the spectrum associated with the affected port using the wavelength selective switch coupled to the one or more ports can include attenuating the spectrum associated with the affected port by a variable amount dependent upon a difference between the power of the affected port and the activation threshold received by the module processor.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An automatic power reduction (APR) system for an optical network module, comprising:
    a multi-fiber interface comprising one or more ports adapted to be coupled to one or more multi-fiber connectors;
    a card processor operable to detect a loss of signal on an input port of the one or more ports and comparing the power of an associated output port to an activation threshold received by the card processor; and
    a module processor operable to, in the event that the loss of signal is detected on the input port and the power of the output port exceeds the activation threshold, trigger the optical network module to execute an APR routine and attenuate spectrum associated with an affected port using a wavelength selective switch coupled to the one or more ports.

2. The APR system of claim 1, wherein the card processor and the module processor are respective functional portions of the same processor.

3. The APR system of claim 1, wherein the module processor is further operable to, in the event that the loss of signal is detected on the input port but the power of the output port does not exceed the activation threshold, decline to trigger the optical network module to execute the APR routine and attenuate the spectrum associated with the affected port using the wavelength selective switch coupled to the one or more ports.

4. The APR system of claim 1, wherein triggering the optical network module to execute the APR routine comprises using a communications line to cause the optical network module to execute the APR routine with priority over other routines.

5. The APR system of claim 1, wherein attenuating the spectrum associated with the affected port using the wavelength selective switch coupled to the one or more ports comprises attenuating the spectrum associated with the affected port by a predetermined amount received by the module processor.

6. The APR system of claim 1, wherein attenuating the spectrum associated with the affected port using the wavelength selective switch coupled to the one or more ports comprises attenuating the spectrum associated with the affected port by a variable amount dependent upon a difference between the power of the affected port and the activation threshold received by the module processor.

7. An automatic power reduction (APR) method for an optical network module, comprising:
   in a multi-fiber interface comprising one or more ports adapted to be coupled to one or more multi-fiber connectors, at a card processor, detecting a loss of signal on an input port of the one or more ports and comparing the power of an associated output port to an activation threshold received by the card processor; and
   in the event that the loss of signal is detected on the input port and the power of the output port exceeds the activation threshold, at a module processor, triggering the optical network module to execute an APR routine and attenuate spectrum associated with an affected port using a wavelength selective switch coupled to the one or more ports.

8. The APR method of claim 7, wherein the card processor and the module processor are respective functional portions of the same processor.

9. The APR method of claim 7, further comprising, in the event that the loss of signal is detected on the input port but the power of the output port does not exceed the activation threshold, at the module processor, declining to trigger the optical network module to execute the APR routine and attenuate the spectrum associated with the affected port using the wavelength selective switch coupled to the one or more ports.

10. The APR method of claim 7, wherein triggering the optical network module to execute the APR routine comprises using a communications line to cause the optical network module to execute the APR routine with priority over other routines.

11. The APR method of claim 7, wherein attenuating the spectrum associated with the affected port using the wavelength selective switch coupled to the one or more ports comprises attenuating the spectrum associated with the affected port by a predetermined amount received by the module processor.

12. The APR method of claim 7, wherein attenuating the spectrum associated with the affected port using the wavelength selective switch coupled to the one or more ports comprises attenuating the spectrum associated with the affected port by a variable amount dependent upon a difference between the power of the affected port and the activation threshold received by the module processor.

13. A computer-readable medium storing computer-executable instructions configured to cause the following steps to occur:
   in a multi-fiber interface comprising one or more ports adapted to be coupled to one or more multi-fiber connectors, at a card processor, detect a loss of signal on an input port of the one or more ports and compare the power of an associated output port to an activation threshold received by the card processor; and
   in the event that the loss of signal is detected on the input port and the power of the output port exceeds the activation threshold, at a module processor, trigger the optical network module to execute an automatic power reduction (APR) routine and attenuate spectrum associated with an affected port using a wavelength selective switch coupled to the one or more ports.

14. The computer-readable medium of claim 13, wherein the card processor and the module processor are respective functional portions of the same processor.

15. The computer-readable medium of claim 13, wherein the steps further comprise, in the event that the loss of signal is detected on the input port but the power of the output port does not exceed the activation threshold, at the module processor, declining to trigger the optical network module to execute the APR routine and attenuate the spectrum associated with the affected port using the wavelength selective switch coupled to the one or more ports.

16. The computer-readable medium of claim 13, wherein triggering the optical network module to execute the APR routine comprises using a communications line to cause the optical network module to execute the APR routine with priority over other routines.

17. The computer-readable medium of claim 13, wherein attenuating the spectrum associated with the affected port using the wavelength selective switch coupled to the one or more ports comprises attenuating the spectrum associated with the affected port by a predetermined amount received by the module processor.

18. The computer-readable medium of claim 13, wherein attenuating the spectrum associated with the affected port using the wavelength selective switch coupled to the one or more ports comprises attenuating the spectrum associated with the affected port by a variable amount dependent upon a difference between the power of the affected port and the activation threshold received by the module processor.

* * * * *